US009155100B2

(12) United States Patent
Tiirola et al.

(10) Patent No.: US 9,155,100 B2
(45) Date of Patent: Oct. 6, 2015

(54) RADIO RESOURCE ALLOCATION MECHANISM

(71) Applicant: Nokia Technologies Oy, Espoo (FI)

(72) Inventors: Esa Tapani Tiirola, Kempele (FI); Kari Pekka Pajukoski, Oulu (FI); Kari Juhani Hooli, Oulu (FI); Kari Horneman, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/891,778

(22) Filed: May 10, 2013

(65) Prior Publication Data

US 2013/0337823 A1    Dec. 19, 2013

Related U.S. Application Data

(63) Continuation of application No. 12/307,746, filed on Jan. 6, 2009, now abandoned, which is a continuation of application No. PCT/FI2007/050010, filed on Jan. 10, 2007.

(30) Foreign Application Priority Data

Jul. 7, 2006    (WO) ................. PCT/FI2006/050324

(51) Int. Cl.
*H04M 3/00*      (2006.01)
*H04W 72/00*     (2009.01)
(Continued)

(52) U.S. Cl.
CPC ............ *H04W 72/082* (2013.01); *H04W 16/10* (2013.01); *H04W 72/08* (2013.01)

(58) Field of Classification Search
CPC ... H04W 72/08; H04W 16/10; H04W 72/082; H04W 72/085; H04W 72/00; H04W 72/04; H04W 40/00; H04W 28/0236; H04W 40/16; H04W 40/18; H04B 7/00; H04B 1/38; H04B 17/00; H04M 1/00; H04M 3/00; H04L 5/003; H04L 5/0039; H04L 5/0069

USPC ................. 455/45, 62, 63.1, 67.11, 418–420, 455/422.1, 423–425, 442–451, 455/452.1–452.2, 453, 509–510, 513, 517, 455/550.1, 556.2, 560–561; 370/310, 314, 370/328–330, 338, 341–345, 347
See application file for complete search history.

(56) References Cited

U.S. PATENT DOCUMENTS 5,293,640 A    3/1994 Gunmar et al.
5,448,754 A    9/1995 Ho et al.
(Continued)

FOREIGN PATENT DOCUMENTS

CN    1198872 A    11/1998
CN    1303575 A    7/2001
(Continued)

OTHER PUBLICATIONS

Baiocchi et al., *Autonomous Optimized Interference Management of CDMA Cellular Access with Multichannel*, 14th 1st Mobile and Wireless Communications Summit, Dresden, Germany, Jun. 19-22, 2005, 5 pages.
(Continued)

*Primary Examiner* — Meless Zewdu
(74) *Attorney, Agent, or Firm* — Alston & Bird LLP

(57) ABSTRACT

A cellular communication system comprising a plurality of user equipment and a network infrastructure. Radio resource of the plurality of cells is divided into more than one radio resource groups. A network infrastructure element detects a requirement of radio resource allocation for a user equipment and determines effective interference to be generated by the required radio resource to a defined group of neighboring cells. User equipment is allocated a radio resource from one of the radio resource groups on the basis of the determined effective interference to be generated to the defined group of neighboring cells. Inter-cell interference decreases and the throughput of the cellular system increases, but the exchange of physical layer information is not increased.

15 Claims, 7 Drawing Sheets

(51) Int. Cl.
*H04B 7/00* (2006.01)
*H04W 72/08* (2009.01)
*H04W 16/10* (2009.01)

(56) References Cited

U.S. PATENT DOCUMENTS

| | | | |
|---|---|---|---|
| 5,491,837 | A | 2/1996 | Haartsen |
| 5,513,246 | A | 4/1996 | Jonsson et al. |
| 5,710,974 | A | 1/1998 | Granlund et al. |
| 5,915,221 | A | 6/1999 | Sawyer et al. |
| 6,028,851 | A | 2/2000 | Persson et al. |
| 6,161,015 | A | 12/2000 | Birchler et al. |
| 6,246,877 | B1 | 6/2001 | Frodigh et al. |
| 6,272,348 | B1 | 8/2001 | Saario et al. |
| 6,498,934 | B1 | 12/2002 | Muller |
| 6,636,736 | B1 | 10/2003 | Billon |
| 6,671,516 | B1 | 12/2003 | Doi |
| 6,813,479 | B2 | 11/2004 | Voyer |
| 6,993,342 | B2 | 1/2006 | Kuchibhotla et al. |
| 7,184,773 | B2 | 2/2007 | Nagai et al. |
| 7,366,507 | B2 | 4/2008 | Ammi et al. |
| 7,433,310 | B2 * | 10/2008 | Marinier .................. 370/232 |
| 7,636,334 | B2 | 12/2009 | Gerlach |
| 7,680,457 | B2 | 3/2010 | Jin et al. |
| 8,031,686 | B2 * | 10/2011 | Li et al. .................. 370/342 |
| 2001/0053695 | A1 | 12/2001 | Wallentin |
| 2003/0013451 | A1 | 1/2003 | Walton |
| 2003/0096618 | A1 | 5/2003 | Palenius |
| 2003/0123425 | A1 | 7/2003 | Walton et al. |
| 2003/0128658 | A1 | 7/2003 | Walton et al. |
| 2003/0169681 | A1 * | 9/2003 | Li et al. .................. 370/203 |
| 2004/0062193 | A1 | 4/2004 | Ma et al. |
| 2004/0100897 | A1 | 5/2004 | Shattil |
| 2005/0002369 | A1 | 1/2005 | Ro et al. |
| 2005/0009532 | A1 | 1/2005 | Cuffaro et al. |
| 2005/0025039 | A1 | 2/2005 | Hwang et al. |
| 2005/0025040 | A1 | 2/2005 | Tang et al. |
| 2005/0031047 | A1 | 2/2005 | Maltsev et al. |
| 2005/0096061 | A1 | 5/2005 | Ji et al. |
| 2005/0099937 | A1 | 5/2005 | Oh et al. |
| 2005/0157639 | A1 | 7/2005 | Song et al. |
| 2005/0239472 | A1 * | 10/2005 | Wei .................. 455/452.2 |
| 2005/0249164 | A1 * | 11/2005 | Kwak et al. .................. 370/335 |
| 2006/0019701 | A1 | 1/2006 | Ji |
| 2006/0153060 | A1 | 7/2006 | Cho |
| 2006/0205412 | A1 | 9/2006 | Oh et al. |
| 2006/0209767 | A1 * | 9/2006 | Chae et al. .................. 370/335 |
| 2006/0211426 | A1 | 9/2006 | Costa et al. |
| 2006/0251041 | A1 | 11/2006 | Pajukoski et al. |
| 2006/0285503 | A1 * | 12/2006 | Mese et al. .................. 370/254 |
| 2007/0171809 | A1 | 7/2007 | Pajukoski et al. |
| 2007/0297323 | A1 | 12/2007 | Seki |
| 2008/0039129 | A1 | 2/2008 | Li et al. |
| 2008/0132242 | A1 | 6/2008 | Hamalainen et al. |
| 2013/0337823 | A1 | 12/2013 | Tiirola et al. |

FOREIGN PATENT DOCUMENTS

| | | |
|---|---|---|
| CN | 1753554 A | 3/2006 |
| CN | 101507312 A | 8/2009 |
| EP | 0680168 A2 | 11/1995 |
| EP | 1014640 A2 | 6/2000 |
| EP | 1526674 A1 | 4/2005 |
| EP | 1538802 A2 | 6/2005 |
| EP | 1566918 A1 | 8/2005 |
| EP | 1589776 A1 | 10/2005 |
| EP | 1594260 A1 | 11/2005 |
| EP | 1603356 A2 | 12/2005 |
| EP | 1653694 A2 | 5/2006 |
| WO | WO-02/49305 A2 | 6/2002 |
| WO | WO-02/067617 A1 | 8/2002 |
| WO | WO-2004/057900 A1 | 7/2004 |
| WO | WO-2005/020613 A2 | 3/2005 |
| WO | WO-2005/101882 A1 | 10/2005 |
| WO | WO-2007/107207 A1 | 9/2007 |

OTHER PUBLICATIONS

Chang, et al., *Power Control, Adaptive Modulation and Subchannel Allocation for Multiuser Downlink OFDM*, IEEE 60$^{th}$ Vehicular Technology Conference, VTC2004-Fall, Sep. 26-29, 2004, Los Angeles, CA, USA, pp. 764-768.

3GPP Technical Report 25.814 V7.1.0, 3$^{rd}$ Generation Partnership Project; Technical Specification Group Radio Access Network; Physical Layer Aspects for Evolved universal Terrestrial Radio Access (UTRA), Release 7, Sep. 2006, 132 pages.

Ericsson. "Text Proposal for TR 25.814, Section 7.1.2.6" 3GPP Draft R1-060712, 3$^{rd}$ Generation Partnership Project (#GPP), Feb. 13-17, 2006, 2 pages, vol. TSG-RAN WG1, No. 44, Denver, USA.

"ACK/NACK Coverage in the Absence of UL Data" 3GPP TSG RAN WG1 #47, R1-063382, Nokia, Agenda item: 6.12.1, Riga, Latvia, Nov. 6-10, 2006, 4 pages.

"Analysis of Inter-cell Power Control for Interference Management in E-UTRA UL", 3GPP TSG-RAN WG1 #46bis, R1-062705, Seoul, Korea, Agenda item 6.8. Oct. 9-13, 2006 17 pages.

"CDM Multiplexing of Synchronous RACH" 3GPP TSG RAN WG1 #47, R1-063361, Nokia, Agenda item: 6.3.1. Riga, Latvia, Nov. 6-10, 2006, 5 pages.

"Multiplexing of L1/L2 Control Signaling when UE has no data to transmit" 3GPP TSG RAN WG1 #47, R1-063380, Nokia, Agenda item: 6.12.1, Riga, Latvia, Nov. 6-10, 2006, 6 pages.

"Orthogonal Multiplexing of L1/L2 Control Signals with UL Data" 3GPP TSG RAN WG1 #47, R1-063381, Nokia, Agenda item: 6.12.1, Riga, Latvia, Nov. 6-10, 2006. 2 pages.

"Power Control and FDM Resource Allocation for E-UTRA Uplink and TP" 3GPP TSG RAN1 #43 Ad Hoc, R1-060026, Motorola, Agenda Item: 5.2.3.4, Helsinki, Finland, Jan. 23-25, 2006, 5 pages.

"System Level Performance of UL SC-FDMA" 3GPPTSG RAN WG1 #43, R1-051411, Nokia, Agenda Item 8.4. Seoul, Korea, Nov. 7-11, 2005. 4 pages.

"UL Interference Control Considerations" 3GPP TSG-RAN WG1 #42, R1-050813, Nokia. Agenda Item: 10.2.2. London, UK, Aug. 19-Sep. 2, 2005, 3 pages.

"UL Reference Signal Structure for E-UTRA" 3GPP TSG RAN WG1 #47, R1-063368, Nokia. Agenda Item: 6.4.2, Riga, Latvia, Nov. 6-10, 2006. 4 pages.

Extended European Search Report for Application No. 07700275.6, Nov. 22, 2012. 10 pages. Germany.

International Search Report and Written Opinion received for corresponding Patent Corporation Treaty Application No. PCT/FI2006/050179, dated Aug. 1, 2006. 10 pages.

International Search Report and Written Opinion received for corresponding Patent Corporation Treaty Application No. PCT/FI2006/050177, dated Aug. 1, 2006. 11 pages.

International Preliminary Report on Patentability received for corresponding Patent Corporation Treaty Application No. PCT/FI2006/050324, dated Jan. 13, 2009. 8 pages.

International Preliminary Report on Patentability received for corresponding Patent Corporation Treaty Application No. PCT/FI2006/050177, dated Nov. 6, 2007. 9 pages.

International Preliminary Report on Patentability received for corresponding Patent Corporation Treaty Application No. PCT/FI2006/050179, dated Nov. 6, 2007. 8 pages.

International Search Report and Written Opinion received for corresponding Patent Corporation Treaty Application No. PCT/FI2006/050324, dated Mar. 23, 2007. 11 pages.

International Search Report and Written Opinion received for corresponding Patent Corporation Treaty Application No. PCT/FI2007/050010, dated Apr. 17, 2007. 10 pages.

International Preliminary Report on Patentability received for corresponding Patent Corporation Treaty Application No. PCT/FI2007/050010, dated Jan. 13, 2009. 7 pages.

International Preliminary Report on Patentability received for corresponding Patent Corporation Treaty Application No. PCT/FI2007/050593, dated May 12, 2009. 9 pages.

International Search Report and Written Opinion received for corresponding Patent Corporation Treaty Application No. PCT/FI2007/050593, dated Feb. 26, 2008. 11 pages.

(56) References Cited

OTHER PUBLICATIONS

Office Action received for Chinese Patent Application No. 200680015507.8, dated Sep. 3, 2010, 3 pages.
Office Action received for Chinese Patent Application No. 200780030970.4, dated Sep. 6, 2010, 4 pages.
Office Action received for Chinese Patent Application No. 200780030970.4, dated May 12, 2011, 8 pages.
Office Action received for Chinese Patent Application No. 200780030970.4, dated Apr. 1, 2012.
Office Action received for Chinese Patent Application No. 200780030970.4, dated Aug. 3, 2011.
Office Action received for Japanese Patent Application No. 2008-509463, dated Jun. 14, 2010, 2 pages.
Office Action received for Korean Patent Application No. 2007-7024384, dated Aug. 10, 2009, 3 pages.
Office Action received for Korean Patent Application No. 2007-7024384, dated Jan. 13, 2010, 3 pages of Office Action and 2 pages of English Translation.
Office Action received for Korean Patent Application No. 2009-7002431, dated Aug. 13, 2010, 11 pages.
Office Action received for Malaysian Patent Application No. PI20061352, dated May 8, 2009, 4 pages.
Office Action received for Malaysian Patent Application No. PI20061872, dated Feb. 20, 2009, 3 pages.
Office Action received for Taiwanese Patent Application No. 95115685, dated Feb. 1, 2010, 2 pages.
Office Action received for Russian Patent Application No. 2009103985, dated Jan. 9, 2010, 7 pages of Office Action and 4 pages of English Translation.
Office Action received for U.S. Appl. No. 11/362,706, dated Nov. 13, 2008, 18 pages.
Office Action received for U.S. Appl. No. 11/362,706, dated Mar. 31, 2010, 14 pages.
Office Action received for U.S. Appl. No. 11/362,706, dated Oct. 1, 2009, 12 pages.
Office Action received for U.S. Appl. No. 11/362,706, dated May 11, 2009, 13 pages.
Office Action received for U.S. Appl. No. 11/396,538, dated Sep. 26, 2008, 20 pages.
Office Action received for U.S. Appl. No. 11/396,538, dated Mar. 19, 2009, 14 pages.
Office Action received for U.S. Appl. No. 11/396,538, dated Sep. 14, 2009, 13 pages.
Office Action received for U.S. Appl. No. 11/396,538, dated Apr. 13, 2010, 15 pages.
Office Action received for U.S. Appl. No. 11/979,504, dated May 6, 2011, 7 pages.
Office Action received for U.S. Appl. No. 11/979,504, dated Feb. 8, 2011, 19 pages.
Office Action received for U.S. Appl. No. 11/979,504, dated Jun. 7, 2012.
Office Action received for U.S. Appl. No. 11/979,504, dated Sep. 11, 2012.
Office Action from European Patent Application No. 07 700 275.6 dated Mar. 2, 2015.
Office Action for Chinese Application No. 201110319038.1 dated Nov. 8, 2013.
Office Action for Chinese Application No. 201110319038.1 dated Mar. 30, 2015.

* cited by examiner

RADIO RESOURCE ALLOCATION MECHANISM

CROSS REFERENCE TO RELATED APPLICATIONS

This application is a continuation of U.S. application Ser. No. 12/307,746, filed Jan. 6, 2009, which is a continuation of International Appl. No. PCT/FI2007/050010, filed Jan. 10, 2007, which claims priority to International Appl. No. PCT/FI2006/050324, filed Jul. 7, 2006.

FIELD OF THE INVENTION

The present invention relates to telecommunications and more particularly to radio resource allocation in cellular communication systems.

BACKGROUND OF THE INVENTION

A cellular network is a radio network made up of a number of radio cells each served by a transceiver, known as a cell site or base station. Cellular networks are inherently asymmetric such that a set of fixed transceivers serve a cell and a set of distributed mobile transceivers provide services to the users.

A cellular network is able to provide more transmission capacity than a single transmitter network because a radio frequency of a cell can be reused in another cell for different transmission. Frequency reuse, however, causes interference between cells that use the same and nearby frequencies.

This inter-cell interference has conventionally been solved by coordination/planning based methods. An example of such methods is frequency reuse where different groups of radio channels may be assigned to adjacent cells, and the same groups are assigned to cells separated by a certain distance (reuse distance) to reduce co-channel interference. The method is relatively effective and straightforward, but wastes channel resource.

Another alternative is provided by co-ordination/planning based methods that comprise use of dynamic channels temporarily assigned for use in cells for the duration of the call, returned and kept in a central pool after the call is over. In some other dynamic solutions the total number of channels is divided into two groups, one of which is used for fixed allocation to the cells, while the other is kept as a central poor to be shared by all users. The reuse factor of these methods still remains low, actually in heavy traffic load they may perform worse than the above disclosed fixed channel assignment method.

In the new emerging systems, for example in the upcoming evolution of 3rd Generation Partnership Project (3GPP) systems (also called as Long Term Evolution (LTE) systems), the requirements, according to the working assumptions, are challenging. The planned frequency reuse factor is 1, and at the same time significantly improved system performance, in terms or average throughput and cell throughput is targeted. In order to meet these challenges, mitigation of inter-cell interference is now extensively studied.

The approaches considered in inter-cell interference mitigation comprise Inter-cell-interference co-ordination/avoidance. The common theme of inter-cell-interference co-ordination/avoidance is to apply restrictions to the resource management (configuration for the common channels and scheduling for the non common channels) in a coordinated way between cells. Such restrictions in a cell will provide the possibility for improvement in (Signal-to-Interference Ratio) SIR, and cell-edge data-rates/coverage, on the corresponding time/frequency resources in a neighbor cell.

The available inter-cell interference co-ordination methods require certain inter-communication between different network nodes in order to set and reconfigure the above mentioned restrictions. However, links between cells are expensive and typically cause delays. Thus, for the time being it seems that reconfiguration of the restrictions will be done on a time scale corresponding to days, and the inter-node communication is going to be very limited, basically with a rate of in the order of days. In such scenarios mechanisms that do not rely on inter-cell co-ordination are critically needed.

SUMMARY OF THE INVENTION

An object of the present invention to provide a solution that enables mitigation of inter-cell interference in a cellular communication system where capacity and system performance requirements are high, and inter-communication of physical layer information between different network nodes is limited. The objects of the invention are achieved by a radio resource allocation method, a cellular communication system, user equipment, a control unit, a network infrastructure element, a computer program product and a computer program distribution medium, which are characterized by what is stated in the independent claims. The preferred embodiments of the invention are disclosed in the dependent claims.

The invention is based on the idea that radio resource of cells in the communication system are divided into more than one radio resource groups. User equipment are then allocated a radio resource from one of the radio resource groups on the basis of the determined interference to be generated to the defined group of neighbouring cells.

An advantage of the invention is that the inter-cell interference decreases and the throughput of the cellular system increases, but the exchange of physical layer information is not increased.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The following embodiments are exemplary implementations of the present invention. Although the specification may refer to "an", "one", or "some" embodiment(s), reference is not necessarily made to and/or a described feature does not apply to only one particular embodiment only. Single features of different embodiments of this specification may be combined to provide further embodiments that are thus considered to belong to the scope of protection.

Figure 1:
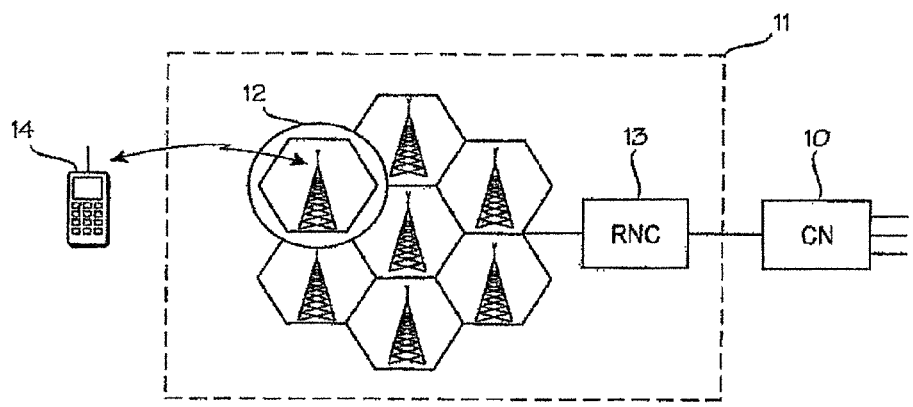
FIG. 1 illustrates a simplified example of a mobile communications system.

FIG. 1 illustrates a simplified example of a cellular communications system to which the present solution may be applied. The system of FIG. 1 is a mobile communication system that comprises a number of wireless access points through which users may connect to the network and thus utilize the communication services of the system. In the following, the invention is described with base station cells of a mobile communications system, where the access point may change when users are moving within the service area of the systems. It should be noted, however, that the solution may be applied in interference control of any access point, notwithstanding whether part of the same or different system as the potentially interfering access points.

A mobile network infrastructure may be logically divided into core network (CN) 10 and radio access network (RAN) 11 infrastructures. The core network 10 is a combination of exchanges and basic transmission equipment, which together provide the basis for network services. The radio access network 11 provides mobile access to a number of core networks of both mobile and fixed origin.

Based on the cellular concept, in RAN a large area is divided into a number of sub-areas called cells. Each cell has its own base station 12, which is able to provide a radio link for a number of simultaneous users by emitting a controlled low-level transmitted signal. In present mobile communications systems RAN typically comprises a separate controlling network element 13, which manages the use and integrity of the radio resources of a group of one or more base stations. However, the scope covers also systems without such separate physical element, for example systems where at least part of the radio network control functions are implemented in the individual base stations.

A user accesses the services of the mobile communication system with user equipment 14 that provides required functionality to communicate over a radio interface defined for the radio access network 11.

Figure 2:
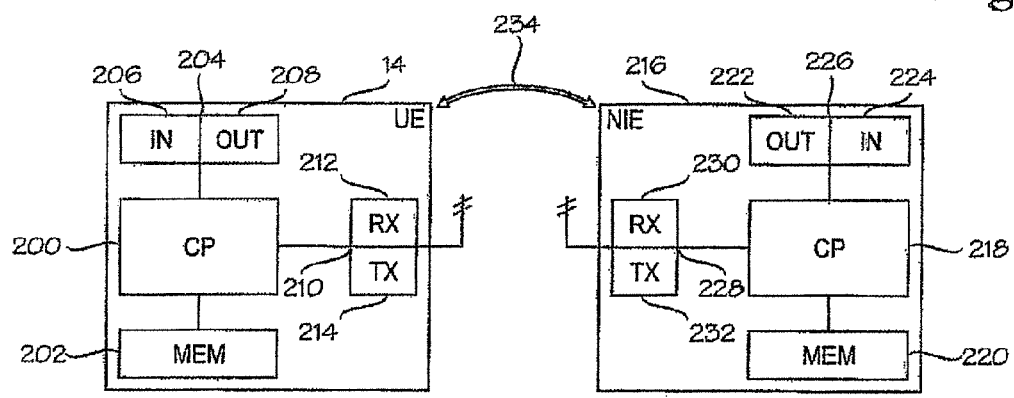
FIG. 2 illustrates the central elements of the embodiment of FIG. 1.

FIG. 2 illustrates in more detail the central elements used in implementing the embodiment of FIG. 1. As described above, a base station is in control of defined (static or dynamic) radio resources, and users communicate with the network infrastructure using a particular radio resource of at least one base station, typically the base station in the coverage area of which the users presently resides.

A mobile communication system utilizes a predefined channel structure, according to the offered communication services. A typical example of a channel structure is a three-tier channel organization where topmost logical channels relate to the type of information to be transmitted, transport channels relate to the way the logical channels are to be transmitted, and the physical channels provide the transmission media through which the information is actually transferred. In this context the role of a base station is to implement radio access physical channels and transfer information from transport channels to the physical channels according to predefined radio network control functions.

Part of the physical channel resource of a cell is typically reserved for some particular use, for example for transport channels that are common for all user equipment in the cell, and those used for initial access. Part of the physical channel resource of a cell may, on the other hand, be allocated dynamically for traffic. FIG. 2 shows elementary configurations for the system elements involved in allocating physical channels for user equipment.

User equipment 14 of the mobile communications system can be a simplified terminal for speech only or a terminal for diverse services. In the latter case the terminal acts as a service platform and supports loading and execution of various functions related to the services. User equipment typically comprises mobile equipment and a subscriber identity module. The subscriber identity module is typically a smart card, often a detachably connected identification card, that holds the subscriber identity, performs authentication algorithms, and stores authentication and encryption keys and other subscription information that is needed at the mobile station. The mobile equipment may be any equipment capable of communicating in a mobile communication system or a combination of several pieces of equipment, for instance a multimedia computer to which a card phone has been connected to provide a mobile connection. In this context, the user equipment thus refers to an entity formed by the subscriber identity module and the actual mobile equipment.

A network infrastructure element 216 of FIG. 2 is any entity comprising the functions that control use of radio resources of at least one cell in the mobile communication system. In the context of the embodiment of FIG. 1, the network infrastructure element 212 may be a base station, or a separate base station control element.

The network infrastructure element 216 comprises processing unit 218, an element that comprises an arithmetic logic unit, a number of special registers and control circuits. Connected to the processing unit is a memory unit 220, a data medium where computer-readable data or programs or user data can be stored. The memory unit typically comprises memory units that allow both reading and writing (RAM), and memory units whose contents can only be read (ROM). The network infrastructure element also comprises an interface unit 222 with input unit 224 for inputting data from other network infrastructure elements, for internal processing in the network infrastructure element, and output unit 226 for outputting data from the internal processes of the network infrastructure element to the other network infrastructure elements. Examples of elements of said input unit comprise network interfaces, generally known to a person skilled in the art.

The network infrastructure unit also comprises a transceiver unit 228 configured with receiving unit 230 for receiving information from the air interface and for inputting the received information to the processing means 218, as well as with transmitting unit 232 for receiving information from the processing means 218, and processing it for sending via the air interface. The implementation of such a transceiver unit is generally known to a person skilled in the art. The processing unit 218, memory unit 220, the interface unit 222, and the transceiver unit 228 of the network infrastructure element are electrically interconnected for performing systematic execution of operations on the received and/or stored data according to predefined, essentially programmed processes of the unit. In systematic execution of the operations the processing unit 218 acts a control unit that may be implemented as a single integrated circuit, or a combination or two or more functionally combined integrated circuits. In a solution according to the invention, the operations comprise the functionality of the network infrastructure element as described with FIGS. 4 and 6.

User equipment of FIG. 2 comprises a processing unit 200, and a memory unit 202. The user equipment also comprises a user interface unit 204 with input unit 206 for inputting data by the user for internal processing in the unit, and output unit 208 for outputting user data from the internal processes of the unit. Examples of said input unit comprise a keypad, or a touch screen, a microphone, or the like. Examples of said output unit comprise a screen, a touch screen, a loudspeaker, or the like.

The user equipment also comprises a radio communication unit 210 configured with a receiver 212 for receiving information from the radio access network 11 over the air interface and processing it for inputting to the processing unit 200, as well as a transmitter 214 for receiving information from the processing unit 200, for further processing and transmitting the information via the air interface to the radio access network 11. The processing unit 200, the memory unit 202, the user interface unit 204, and the radio communication unit 210 are electrically interconnected for performing systematic execution of operations on the received and/or stored data according to predefined, essentially programmed processes of the user equipment. In a solution according to the invention, the operations comprise the functionality of the user equipment as described with FIGS. 4 and 5.

In the embodiment of FIG. 2, the radio resource of each cell exists in the form of frequency band, and is divided into radio resource units in form of physical channels. A physical channel 234 is typically defined by its carrier frequency, and one or more parameters according to the selected multiple access scheme. For example, a physical channel of wideband code division multiple access (WCDMA) scheme is defined by its carrier frequency, channelisation code (CDMA) and relative phase for the uplink connection. In time division multiple access (TDMA) a radio frequency is divided into time slots and a physical channel corresponds to one or more time slots. In frequency division multiple access (FDMA) technique in which each user receives a radio channel of its own on a common frequency band. In the emerging systems, these basic forms of multiple access schemes are combined into more and more sophisticated schemes to meet the key performance and capability targets for rational long-term evolution. For example, in the upcoming evolution of 3rd Generation Partnership Project (3GPP) LTE systems, a potential candidate for uplink is single carrier FDMA (SC-FDMA). During channel allocation a dedicated channel in form of unique combination of transmission parameters defining a radio resource is agreed between the network infrastructure element and the user equipment so that information streams to and from the user equipment can be differentiated in the air interface.

For mobility management purposes, when the user moves within the coverage area of the system, user equipment 14 continuously receives and transmits signals using the undedicated physical channels arranged into the system. When there is user data to be transmitted to or from the user equipment, a dedicated radio resource, as described above, needs to be allocated to the task. Allocation is typically performed through a predefined signaling procedure, which takes place between the user equipment 14, and the network infrastructure element 216 that controls the radio resource from which the allocation is to be made. Basic channel allocation procedures are widely documented, and well known to a person skilled in the art, and therefore not described in more detail herein. As a result of the channel allocation, a unique radio resource is allocated to the user equipment, and the network infrastructure and the user equipment begin to transmit and receive using the transmission parameters that define the allocated radio resource.

Figure 3:
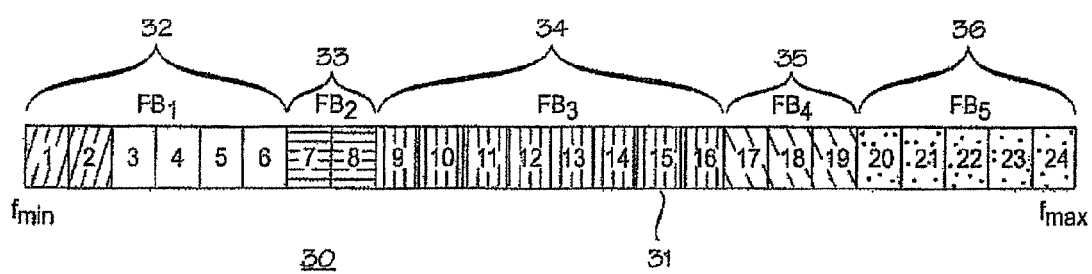
FIG. 3 illustrates the radio resource of a cell in the embodiment of FIG. 2.

FIG. 3 illustrates the radio resource of a cell in an embodiment of FIG. 2. The radio resource corresponds to a continuous set of frequencies F lying between two specified limiting frequencies $f_{min}$ and $f_{max}$. The set of frequencies F forms a frequency band 30. The carrier frequency of the frequency unit increases towards the limiting frequency $f_{max}$. According to the invention, the frequency band 30 is divided into more than one frequency groups 32, 33, 34, 35, 36, wherein each frequency group comprises one or more radio resource units 31. As described above, a radio resource unit 31 may correspond to a carrier frequency, timeslot, spread spectrum code, or any other combination of transmission parameters that may be separately allocated to users, depending on the selected multiple access scheme. For simple graphical illustration, the exemplary frequency groups 32, 33, 34, 35, 36 of FIG. 3 are shown as comprised of one or more adjacent radio frequency carriers. It is clear that the radio resource groups according to the invention may comprise any logical combination of a number of related radio resource units that for a purpose can be dealt with as an entity. For example, a radio resource group can consist of a number of (for example 2-4) physical radio resource units that may, or may not reside next to each other in the frequency domain.

As will be described in the following, user equipment requiring dedicated transmission capacity will be allocated a radio resource from the radio resource group in the serving cell, and the radio resource group will be selected on the basis of interference to be generated by the user equipment to the surrounding cells.

Figure 4:
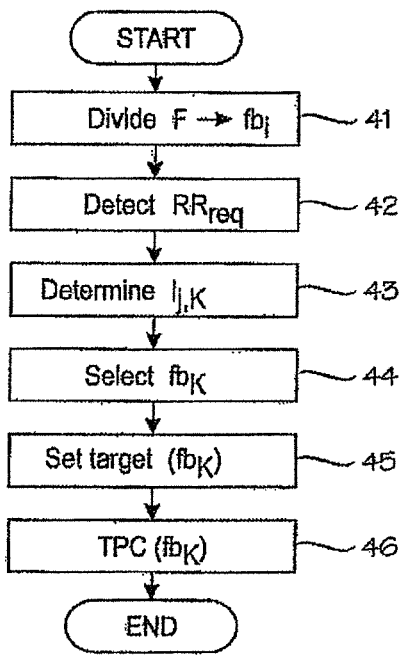
FIG. 4 illustrates the steps of the improved radio resource allocation method.

FIG. 4 illustrates the steps of the embodied radio resource allocation method according to the invention, applied to the embodied system described in FIGS. 1, 2, and 3. As discussed above, the radio resource of a plurality of cells is first divided (step 41) into more than one radio resource groups.

Radio resource allocation begins when the network infrastructure element 216 detects (step 42) a need for dedicated or shared radio resource of the cell 12 for the user equipment 14. Such may happen, for example, when the user of user equipment 14 initiates a call or a session, at handover procedures, where the user equipment moves from one cell to another, and at setup of user equipment terminated call or session. In the following, the case of radio resource request by the user equipment is described as an example.

The radio resource request inherently or explicitly specifies transmission characteristics of the required radio resource. Advanced cellular communications systems may employ several data modulation schemes (e.g. quadrature phase shift keying (QPSK) and quadrature amplitude modulation (QAM)) to transfer data with variable data rates. Additionally, several coding schemes may also be implemented with different effective code rates (ECR). In the radio resource request, the user equipment specifies the required data modulation schemes and code rates it uses. These transmission characteristics of the requested radio resource are typically specific to the user equipment and vary, for example, according to the supported data modulation and coding scheme supported by the user equipment. However, if the user equipment can support more than one data modulation and coding schemes, the transmission characteristics of the requested radio resource may even vary according to the communication instance, and the data modulation and coding scheme combination chosen for the instance.

When a radio resource request reaches the network infrastructure element, the network infrastructure element analyses from the request the relevant transmission characteristics, and if possible allocates a radio resource that corresponds to the transmission characteristics, rejects the request, or initiates a signalling procedure to re-negotiate with the user equipment new, achievable characteristics.

According to the invention, channel allocation is adjusted to take into consideration the interference to be generated by the requested radio resource to a defined group of neighbouring cells. The interference is determined (step 43) in the network infrastructure element on the basis of information on the transmission paths to the defined group of neighbouring cells, provided by the user equipment.

Figure 5:
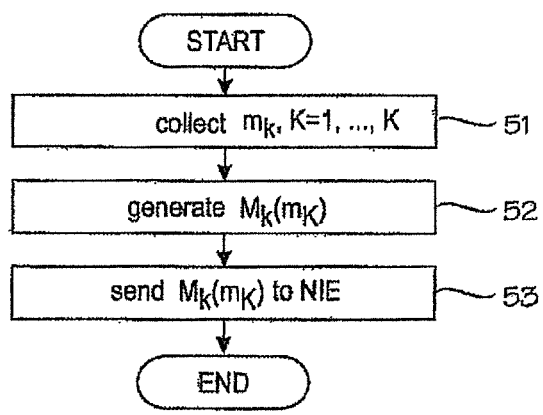
FIG. 5 illustrates the step of determining the interference from the point of view of the user equipment.

FIG. 5 illustrates the step 43 of determining the interference in the embodied radio resource allocation method from the point of view of the user equipment 14. In general terms, the user equipment acquires the required information on the transmission paths to the defined group of neighbouring cells, and provides this information to the network infrastructure to be used in channel allocation decisions. More specifically, for handover purposes the user equipment continuously collects measurement data $m_k$, k=1, . . . , K, that provides basis for computing the properties of the transmission paths to a selected group of neighbouring cells (step 51). Here m denotes measurement data element, k denotes the identity of a cell, and K the number of cells in the selected group of cells.

Within the scope of protection, the selection of the group can be implemented in various ways. For example, the handover procedures utilize groups to which cells are classified according to the pilot signal of the radio link. As an example, an active set comprises cells that form a soft handover connection to the mobile station, a candidate set comprises cells that are not presently used in the soft handover connection, but whose pilot signals are strong enough to be added to the active set, and a neighbour set or monitored set is the list of cells that the user equipment continuously measures, but whose pilot signals are not strong enough to be added to the active set. The selection of the group can thus be a dynamic decision based on signal levels, for example, as in any of the above groups, or a static definition based on some other criteria, for example, geometric locations of the user equipment, etc.

The conventional measurement types comprise, for example, intra-frequency measurements, inter-frequency measurements, inter-system-measurements, traffic volume measurements, quality measurements and internal measurements of the user equipment transmission power and user equipment received signal level. In the emerging systems, some new measurement types may also be applied. The measurement events may be triggered based on several criteria, for example at change of best cell, change in defined pilot channel signal level, changes in the signal-to-noise (SIR) level, periodically, etc. Through these measurement procedures, the user equipment has a substantial basis for estimating the characteristics of the transmission paths to the selected group of surrounding cells.

According to the invention, the user equipment generates (step 52) from the measurement data $m_k$ a plurality of measurement indications $M_k$ that represent properties of the transmission paths to the k=1, . . . , K cells of the selected group, and thus serve as a basis for estimating interference to be generated to the selected group of cells by a particular radio resource of a user equipment. Depending on the complexity of the computations, and the processing capacity of the user equipment, the measurement indications $M_k$ may be simple measurement data to be forwarded to the network side for further processing, or more or less computed values directly applicable for further analysis. In the embodied solution, the measurement indication $M_k$ by the user equipment comprises advantageously values of measured path loss to the cells in the active group.

The user equipment sends (step 53) the measurement indications $M_k$ of all the cells in the selected group of K cells to the controlling network infrastructure element such that they are available in the network infrastructure element at least at the time of the radio resource allocation. Transfer of measurement indication events can be triggered in line with some other measurement events, or be based on a separate scheme, for example take place periodically or at the time of connection setup.

Figure 6:
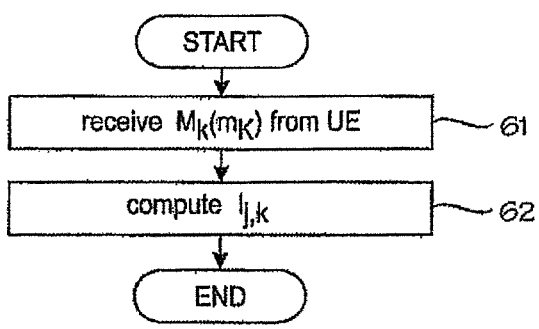
FIG. 6 illustrates the step of determining the interference in the embodied radio resource allocation method from the point of view of the network infrastructure element.

Correspondingly, FIG. 6 illustrates the step 43 of determining the interference in the embodied radio resource allocation method from the point of view of the network infrastructure element 216. In general terms, the network infrastructure element receives the information on the transmission paths to the defined group of neighbouring cells from the user equipment, and uses this information to select an appropriate radio resource group for the user equipment. More specifically, the network infrastructure element $NTE_j$ receives (61) measurement indication values $M_k$ from the user equipment. On the basis of the measurement indication values $M_k$, the network infrastructure element computes (step 62) one or more interference values $I_{j,k}$ that represent the effective interference to be incurred by the requested radio resource to the selected group of neighbouring cells. Effective interference relates herein to the interference that is considered relevant for the radio resource allocation and is associated with a particular computing method. Several different measurement indications are applicable. In the presently embodied example, the network infrastructure element $NIE_j$ receives from the user equipment the computed path loss values $p_k$ for the transmission path between the user equipment and the cells in its active group, and computes effective interference $I_{j,K}$ as total interference to the active group by the equation $$I_j = \sum_{\substack{k=1 \\ k \neq j}}^{K} p_k$$

where j is the index of the own cell, $p_k$ is the measured path loss to the kth cell, and K is the number of cells in the active set. Other computing methods, for example, weighted averages or the like are possible within the scope of protection.

In another embodiment of the invention, the network infrastructure element NIEj computes the effective interference $I_{j,K}$ on the basis of the Channel Quality Indicator (CQI) values, received from the user equipment. The CQI reporting concept is basically a concept for the downlink, and the user equipment is configured to measure CQI to be able to provide to the base station a metric, which indicates the current experienced channel quality. User equipment may, for example, suggest a radio resource transmission configuration that it needs to support while observing a certain block error probability. Different receiver implementations typically offer a different mapping between SINR and sustained throughput. A good downlink channel indicated by the CQI measurements of the user equipment means lower path loss and transmission power, and accordingly corresponds with lower interference to the selected group of neighboring cells. The user equipment generates measurement indications $M_k$ in form of CQI measurements, which in this embodiment serve as a basis for estimating interference to be generated to the selected group of cells by a particular radio resource of user equipment. The effective interference $I_{j,K}$ to be incurred by the radio resource associated with the user equipment to the selected group of neighbouring cells can be determined on the basis of the CQI values of the user equipment directly or through simple correlation.

According to the invention, the users are arranged into different radio resource groups by allocating their radio resources according to a computed value that represent interference to be generated to defined neighbouring cells. Users whose requested radio resource is estimated to generate a similar interference to the surrounding cells, will be allocated to the same radio resource groups. Accordingly, based on the computed total interference $I_{j,K}$ the embodied network infrastructure element selects (step 44) a radio resource group $f_K$ from which the radio resource is to be allocated. In the embodied case, each of the frequency groups 32, 33, 34, 35, 36 of the frequency band 30 correspond to a defined range of total interference values. The computation of the total interference provides a value $I_{j,K}$, for the interference. A corresponding frequency group may determined by comparing the value $I_{j,K}$, to the ranges, and choosing the frequency group in the range of which the value exits. The channel allocation may then be made from the determined frequency group. Channel allocation within a frequency group may be made using a selected multiple access scheme, for example, FDMA, CDMA, TDMA, etc., and the channel may utilize one or more radio resource units of the frequency group.

Through the invented mechanism, a plurality of user equipment that cause similar interference to relevant neighbouring cells becomes automatically arranged to the same frequency group. The power control of the user equipment classified to frequency groups as described above can then managed separately, which gives rise to several advantages.

Cellular systems typically comprise a mechanism by which a network infrastructure element, like a base station, can command user equipment to increase or decrease the uplink transmission power. The comparison involving the received power is based on a predefined measurement parameter, for example, signal-to-interference ratio (SIR), signal-to-noise ratio, signal strength, Frame Error Ratio (FER) and Bit Error Ratio (BER). The base station receives the user equipment signal, estimates a pre-defined parameter, for example, signal-to-noise-power ratio and/or signal-to-interference-power ratio, compares the estimated value with a pre-defined threshold value and, when necessary, sends a transmission power command to the user equipment to increase or decrease its signal power.

When physical layer information of several cells is available to a controlling network element, the network infrastructure element is able to co-ordinate the allowed power levels of the cells and target SIRs to be used by the base stations. When exchange of physical layer information between base stations is limited, only methods that apply pre-defined control procedures and levels are practically possible. In addition, the size of cells in mobile communications systems varies considerably, which means that also the dynamic range for transmission path measurements, for example path loss measurements varies accordingly. With large and moderate cell sizes the dynamic range is adequate, and measurements of the transmission path within the own cell, and arranging users in frequency groups accordingly would already be enough to provide the increased performance. However, with smaller size cells the dynamic range for, for example, path loss measurements becomes correspondingly smaller, and the granularity of the path loss measurements within the own cell may in some cases be deficient. The full effect of the information received from the user equipment is achieved by utilizing information on the plurality of transmission paths to the neighbouring cells.

In a typical environment, signals transmitted from user terminals located close to a base station are expected to induce a smaller interference to the neighbouring cells and signals transmitted from user terminals distant to a base station (i.e. located at the edge of a cell) a more significant interference. User terminals located at the edge of the cell are likely to be allocated to the same subgroup and the user terminals located close to the base station to the same subgroup, which means that the negative effect of "near-far" problem is reduced.

In addition, the classification is based, not only on the path loss in the own cell, but on information or estimates on a comprehensive amount of radio links to the surrounding cells and is therefore more accurate and thus effective, even with smaller cell sizes. The reduced interference results in increased overall performance and system capacity.

In the embodied example, the base station receives the user equipment signal, estimates a pre-defined parameter, for example, signal-to-noise-power ratio and/or signal-to-interference-power ratio, compares the estimated value with a pre-defined threshold value and, when necessary, sends a transmission power command to the user equipment to increase or decrease its signal power. According to the invention, the system may set (step 45) a different target value for each radio resource group such that high signal-to-noise-power ratio and/or signal-to-interference-power ratio can be used in radio resource groups where user equipment generate only moderate interference to the other cells. Correspondingly, in the radio resource groups where interference to the other cells is considerable, lower signal-to-noise-power ratio and/or signal-to-interference-power ratio needs to be used. When the power is adjusted (step 46) according to the improved method, the user equipment that generates moderate interference may be commanded to use higher transmission power and thus achieve higher throughput, while the transmission power of the more interfering user equipment can be effectively controlled at the same time. Use of similar classification criteria in all the cells results in increased throughput rates and higher overall performance of the system.

In another exemplary embodiment, the radio resource unit separately allocatable to a user corresponds to a resource block in time and frequency domain, further divisioned by means of block-level spreading codes. As an example of such code divisional multiple (CDM) access scheme, block-wise spreading using Hadamard codes is discussed in more detail.

Figure 7A:
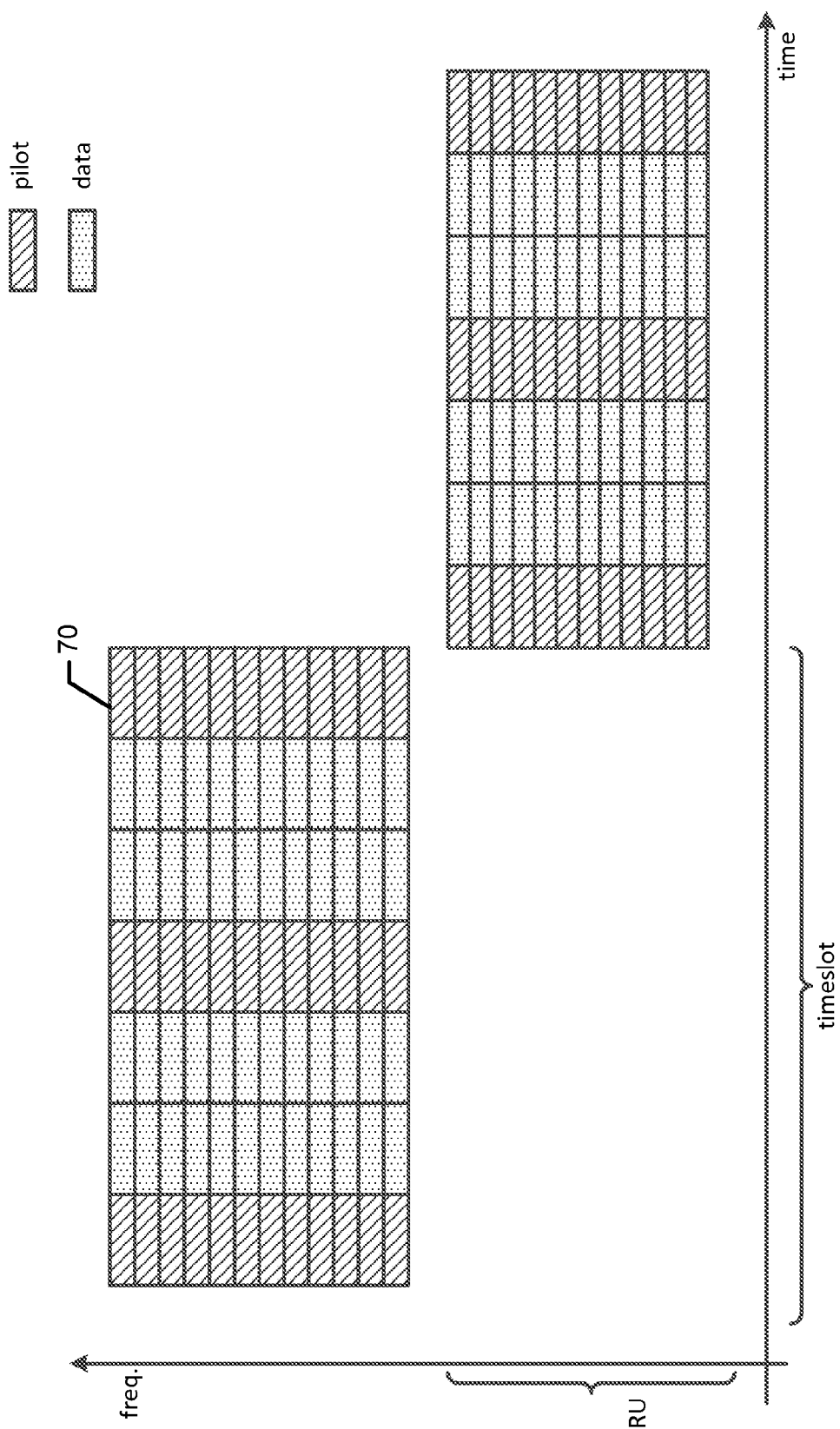
FIGS. 7A and 7B show a basic timeslot structure for uplink data transmission.
Figure 7B:
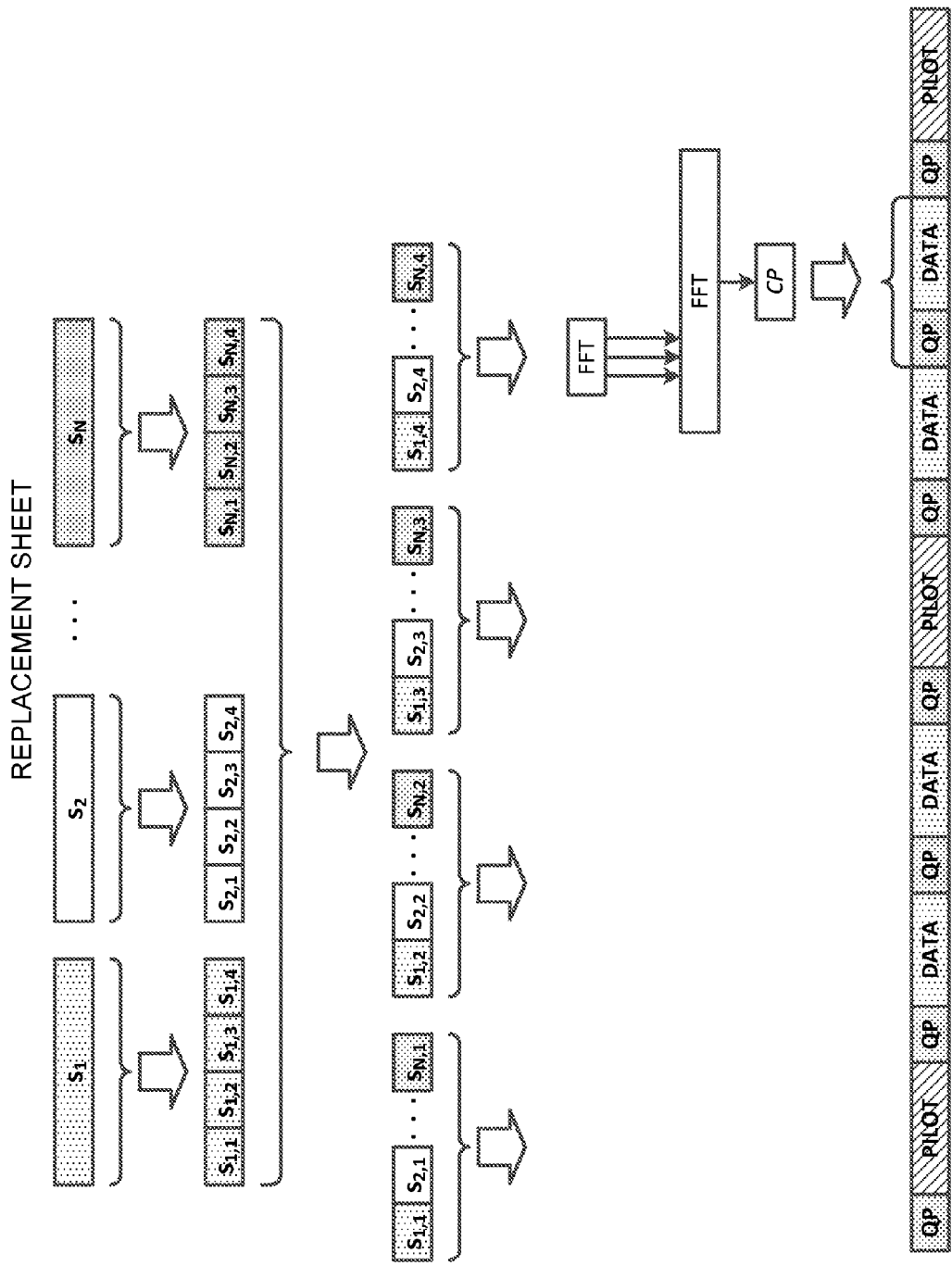

The basic uplink transmission scheme of SC-FDMA is single-carrier transmission with cyclic prefix to achieve uplink inter-user orthogonality and to enable efficient frequency-domain equalization at the receiver side. Frequency-domain generation of the signal, sometimes known as DFT-spread OFDM (Discrete Fourier Transform-spread Orthogonal Frequency Division Multiplexing), is assumed. FIGS. 7A and 7B show a basic timeslot structure for uplink data transmission.

FIG. 7A illustrates a basic structure of a timeslot 70 in the time and frequency domain in the SC-FDMA basic transmission scheme. The channel-coded, interleaved, and data-modulated information is mapped onto SC-FDMA time/frequency symbols. The overall SC-FDMA time/frequency resource symbols can be organized into a number of resource units (RU). Each RU consists of a number of consecutive or non-consecutive sub-carriers within one timeslot. The timeslot 70 corresponds to a cyclic time interval that can be recognized and defined uniquely.

FIG. 7B illustrates the concept of block-wise spreading, applied on top of the SC-FDMA basic transmission scheme. In the example of FIG. 7B, the basic timeslot comprises seven separate blocks for control and/or data transmission. At least one of the blocks is used as a reference signal. Three blocks (LB#1 and LB#4 and LB#7) are used for pilot transmission. This is due to the fact that when spreading is applied, the operation point in terms of SNR decreases. The arrangement aims to increase pilot energy and that way optimize link performance in spreading. In addition, with increased amount of pilot symbols it is possible to generate more orthogonal pilot signals. It should be noted that the data transmission may include either or both of scheduled data transmission and contention based data transmission.

In block-wise spreading, the overall SC-FDMA time/frequency symbols are organized into a number of radio resource units. Each radio resource unit basically corresponds to a number of symbols during a block LB# within one timeslot. In the present embodiment, as shown in FIG. 7B, before entering the basic DFT-s-OFDM transmission 72, the coded symbol sequences $S_1, S_2, \ldots, S_N$ undergo a block-wise spreading 71 using Hadamard codes of length four.

Thus, for example, an allocation of a single physical resource block provides four orthogonal resources in 180 kHz frequency band, each with a symbol rate of 24 ks/s. Each radio resource unit is capable to convey 24 information bits assuming quadrature phase shift keying (QPSK) with effective coding rate of 1/2 and Transmission Time Interval (TTI) of 1 ms.

In TDM/FDM/CDM radio a resource unit is thus separable unit in time and frequency domain, divisioned by a channelization code that comprises one or more spreading codes of one or more type. Separable in this context refers to the fact that two radio resource units with different positions in the code domain are different, even if other factors identifying the radio resource units are the same. A position of a radio resource block in the time or frequency domain does not need to be singular, for example a radio resource unit may comprise a number of consecutive long blocks or consecutive or non-consecutive subcarriers. In the present embodiment a radio resource unit corresponds to a physical resource block in a defined time and frequency divisioned by means of Hadamard spreading code. The channelization code in this context thus comprises a Hadamard spreading code applied block-wise to the coded sequence of symbols.

In interference considerations, maintaining orthogonality of the code channels is of importance. However, user equipment that apply the same code channels in different cells are inherently non-orthogonal. In order to control interference for the transmissions, allocations of radio resource units need to be implemented in a coordinated manner such that the effective interference due to the user equipment in any of the neighboring cells is minimized. Furthermore, as discussed above, there should be an opportunity to enable this without relying on additional signaling, or only on limited amount of additional signaling between the base stations.

According to the invention, such coordination may be implemented by means of grouping available radio resource units of cells, associating each group with a spreading code and an interference criterion, mapping the interference state of the transmission path reported by user equipment to the interference criterion, and allocating a radio resource unit from a group associated with the interference criterion. As an example of such arrangement, allocations of radio resource units whose configuration was illustrated in FIG. 7 are described in more detail.

Figure 8:
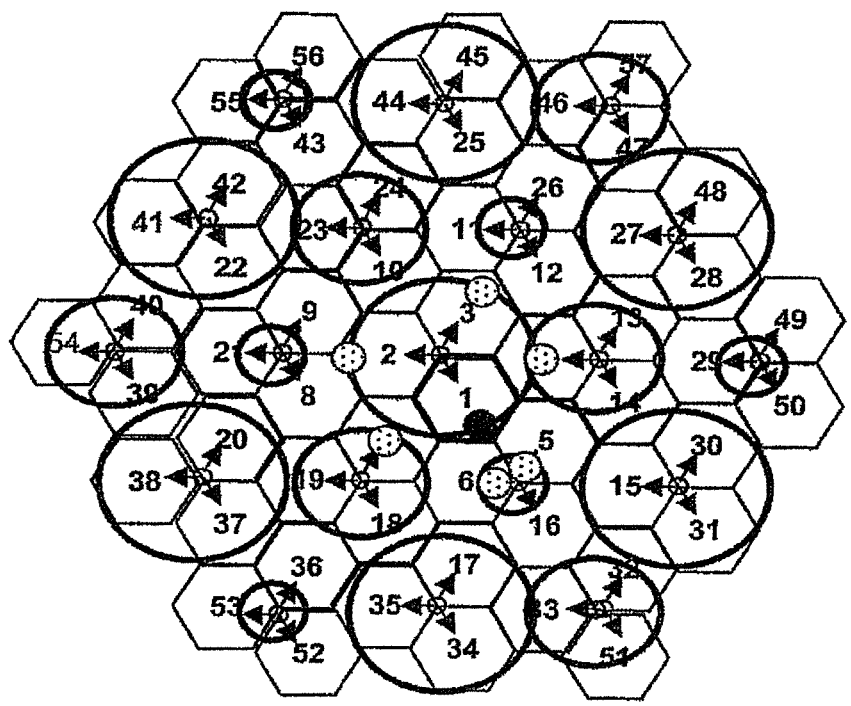
FIG. 8 illustrates a schematic representation of a network configuration in a cellular communication system.

As an exemplary embodiment, FIG. 8 illustrates a schematic representation of a network configuration in a cellular communication system. The system comprises 57 cells formed by base station sectors $BS_n$, n=1, . . . 57 in 19 base station sites $S_m$, m=1, . . . , 19. Each base station site comprises three base station sectors, the transceivers of each of the base station sectors co-locating in the central cross-point of the cellular coverage areas. Base station sites $S_m$, m=1, . . . , 19 are divided into three classes of Type A, Type B, Type C in a following way:

| Sites, type A | | | |
|---|---|---|---|
| S1  | BS1  | BS2  | BS3  |
| S8  | BS15 | BS30 | BS31 |
| S10 | BS17 | BS34 | BS35 |
| S12 | BS20 | BS37 | BS38 |
| S14 | BS22 | BS41 | BS42 |
| S16 | BS25 | BS44 | BS45 |
| S18 | BS27 | BS28 | BS48 |

| Sites, type B | | | |
|---|---|---|---|
| S2  | BS4  | BS13 | BS14 |
| S4  | BS7  | BS9  | BS19 |
| S6  | BS10 | BS23 | BS24 |
| S9  | BS32 | BS33 | BS51 |
| S13 | BS39 | BS40 | BS54 |
| S17 | BS46 | BS47 | BS57 |

| Sites, type C | | | |
|---|---|---|---|
| S3  | BS5  | BS6  | BS16 |
| S5  | BS8  | BS9  | BS21 |
| S7  | BS11 | BS12 | BS26 |
| S11 | BS36 | BS52 | BS53 |
| S15 | BS43 | BS55 | BS56 |
| S19 | BS29 | BS49 | BS50 |

According to the invention, each of the cells provides a radio resource comprised of a number of separately allocatable radio resource units. In the present embodiment, such radio resource units correspond to a physical resource block allocation divisioned by means of Hadamard spreading codes. In the example of FIG. 8, order four Hadamard codes are used, such that each row of matrix W corresponds with a spreading code $C_i$.

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} C1 \\ C2 \\ C3 \\ C4 \end{bmatrix}$$

In any of the cells $BS_n$, n=1, . . . 57, radio resource units with the same spreading code form a radio resource group. In the embodiment of FIG. 8, three different radio resource groups G1, G2, G3 are used. This means that three spreading codes, for example,

C1: [1 1 1 1]
C2: [1 −1 1 −1]
C3: [1 1 −1 −1]

from matrix W are utilized, and each of the group corresponds with one radio resource group. For example in site S1 of type A, base station sector BS1 is configured with three radio resource groups G1, G2, G3 and the radio resource groups correspond with spreading codes as follows:

C1:=:G1
C2:=:G2
C3:=:G3.

Each of the groups of base station sector BS1 is also associated with a range of measurement indication values as follows G1:=:{range1}
G2:=:{range2}
G3:=:{range3}.

In operation the transceiver of the base station sector BS1 receives measurement indication from user equipment UE 1 80 located in the edge of cell of base station sector BS1. BS1 checks to which of the ranges {range1}, {range2}, {range 3} the measurement indication value falls, and selects the radio resource unit for allocation from the corresponding group G1, G2, G3.

The measurement indication in this embodiment provides information from the transmission path between the user equipment that generated the measurement indication and the transceiver of the current base station sector. Exemplary parameters applicable for use as the measurement indication in this embodiment comprise path loss, channel quality indicator (CQI), signal-to-noise ratio (SNR), and signal-to-interference ratio (SINR). Other similar parameters may naturally be applied without deviating from the scope of protection.

Considering the current example utilizing path loss determination, the base station derives from the received measurement indication, either directly or through calculation, a path loss value that corresponds with one of the ranges {range 1} applied in the base station sector BS1. BS1 allocates radio resource units to the user equipment according to this path loss classification, which results in that user equipment in sectors of equal distance from the transceiver of the base station site have the same spreading code allocated.

According to the invention, in the current embodiment all base station sectors BS1, BS2, BS3 within one base station site S1 apply the same set of codes, ranges and groups, and the correspondence between groups and codes and between groups and ranges is the same. The effective interference to be generated to the neighbouring cells is determined by considering the orthogonality between transmissions of the user equipment for which the radio resource allocation is to be made and of user equipment locating in any of the neighboring cells. The defined group of neighboring cells used as a basis for interference considerations in this embodiment may comprise all cells neighboring the cell that is currently allocating the radio resource unit.

The orthogonality between user equipment that apply the same block-level spreading code is improved by a coordinated allocation scheme that aims to maximize the spatial distance between such user equipment. In the present embodiment this is achieved by configuring the cells such that in Type A sites S1, S8, S10, S12, S14, S16, S18, in Type B sites 2, 4, 6, 9, 13, 17, and in Type C sites S3, S5 , S7, S11, S15, the same set of codes, ranges and groups are applied, but the correspondence between groups and codes and/or between groups and ranges in each of the Type A, B or C sites is arranged to be different. This results in situation illustrated in FIG. 8 by different sizes of circles over the cells. The relative distance of user equipment using the same spreading code is illustrated by the size of the circle. It may be seen that by changing the mapping between the groups and ranges or between the groups and spreading codes, the spatial distance between user equipment that use the same spreading code in neighboring cells may be maximized. This provides favorable interference conditions, which is especially critical to the user equipment located at the cell edges.

It is also appreciated that as far as timing of different code channels is within cyclic prefix duration, different code channels are substantially orthogonal. The orthogonality starts to degrade gradually as the timing difference between the code channels increases. Considering user equipment UE1 located in the edge of cell of base station sector BS1, the dominant interferers are also located at the cell edge and have similar propagation loss values in respect of BS1 as user equipment UE1. While the grouping in this embodiment is related to the propagation distance, in a synchronized system the uplink timing is relatively similar for user equipment UE1 and its dominant interferers. Also the physical distance between user equipment UE1 and its dominant interferers is relatively small. This means that timing differences between the user equipment UE1 and its dominant interferers in relation to the base station sector transceiver BS1 are typically within the cyclic prefix duration and the code channels thus remain adequately orthogonal.

For a person skilled in the art it is clear that the above example may be varied in several ways without deviating from the scope of protection. For example, the mapping between the ranges, groups and codes may be arranged and changed in several ways. As an example, any of the codes, the groups, and the ranges may be arranged into a predefined order and mapped to the other counterparts in that order, for example, by rotating the order to begin from a different point for each of the base station site classes. Furthermore, the principle may be implemented also when the base station sites are not sectored; in such case the application of same sets of ranges and groups is naturally inherent.

Figure 9:
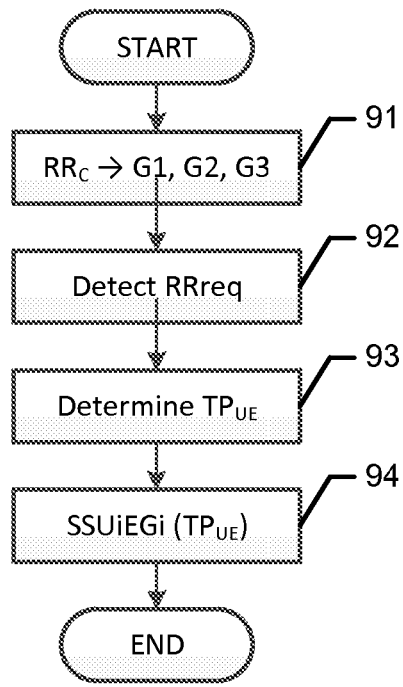
FIG. 9 illustrates the steps of another embodied radio resource allocation method.

FIG. 9 illustrates the steps of the presently embodied radio resource allocation method according to the invention, applied to the embodied system as described in FIGS. 1, 2, and 7, As discussed above, the radio resource units in a cell is first divided (step 91) into more than one radio resource groups G1, G2, G3.

Radio resource allocation begins when the network infrastructure element controlling the radio resource of the cell detects (step 92) a need for dedicated or shared radio resource of the cell for user equipment. When a request $RR_{req}$ for radio resource reaches the network infrastructure element, the network infrastructure element analyses relevant transmission characteristics in the transmission path $TP_{UE}$ between the user equipment and the transceiver of the cell. The transmission characteristics may be determined, for example, from measurement indications in the request or on the basis of earlier measurement indications received from the user equipment. If possible the network infrastructure element allocates a radio resource unit $rru_i$ (step 94) according to a predefined allocation scheme, rejects the request, or initiates a signalling procedure to re-negotiate with the user equipment new, achievable characteristics. In this embodiment the predefined allocation scheme is adjusted to take into consideration the interference between user equipment using the same channel code in neighbouring cells. Thus in step 94, the radio resource unit $rru_i$ is allocated from group $G_i$ that is selected on the basis of the determined relevant transmission characteristics in the transmission path $TP_{UE}$ between the user equipment and the transceiver of the cell, as discussed in the context of FIG. 8.

Figure 10:
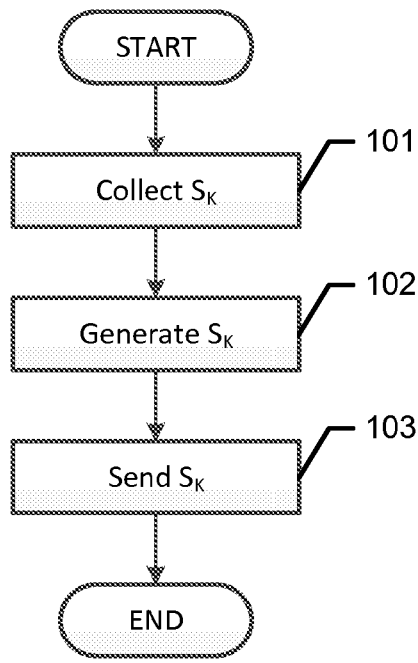
FIG. 10 illustrates a procedure for implementing a step in the embodied radio resource allocation method of FIG. 9.

FIG. 10 illustrates in more detail a procedure for implementing step 93 in the embodied radio resource allocation method of FIG. 9 from the point of view of the user equipment. In general terms, the user equipment acquires the required information on the transmission path in the current cell, and provides this information to the network infrastructure to be used in channel allocation decisions. More specifically, for handover purposes the user equipment continuously collects measurement data $s_k$, that provides basis for computing the properties of the transmission path in the current cell (step 101). According to the invention, the user equipment generates (step 102) from the measurement data $s_k$ a measurement indication $S_k$ that indicates properties of the transmission paths to the current cell. Depending on the complexity of the computations, and the processing capacity of the user equipment, the measurement indication $S_k$ may be simple measurement data to be forwarded to the network side for further processing, or more or less computed values directly applicable for further analysis. In the embodied solution, the measurement indication $S_k$ by the user equipment comprises advantageously values of measured path loss to the current cell.

The user equipment sends (step 103) the measurement indications $S_k$ to the controlling network infrastructure element such that it is available in the network infrastructure element at least at the time of the radio resource allocation. Transfer of measurement indication events can be triggered in line with some other measurement events, or be based on a separate scheme, for example take place periodically or at the time of connection setup.

Figure 11:
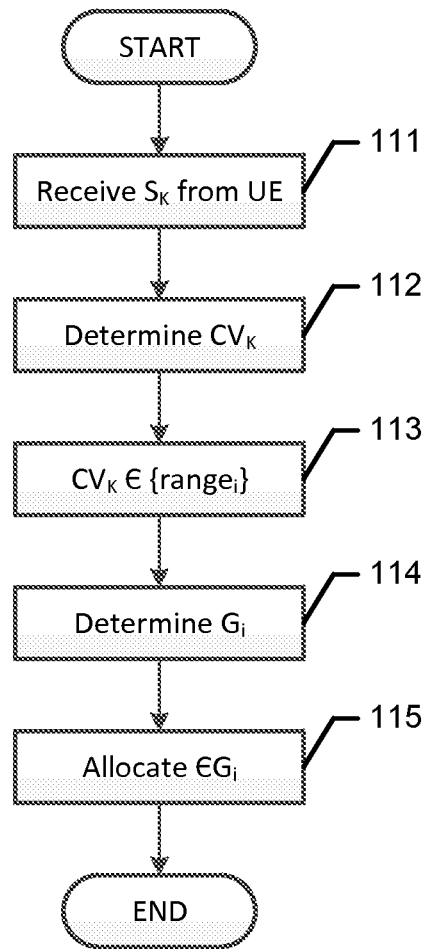
FIG. 11 illustrates a step 93 determining the interference in the embodied radio resource allocation method.

Correspondingly, FIG. 11 illustrates the step 93 of determining the interference in the embodied radio resource allocation method from the point of view of the network infrastructure element. In general terms, the network infrastructure element receives the information on the transmission path to current cell, and uses this information to select an appropriate radio resource group for the user equipment. More specifically, the network infrastructure element $NIE_j$ receives (111) a measurement indication value $S_k$ from the user equipment. On the basis of the measurement indication value $S_k$, the network infrastructure element reads, derives or computes (step 112) a comparison value $CV_k$ that represents the propagation distance of the transmission path. The network infrastructure element compares (step 113) the comparison value $CV_k$ to a group of predefined ranges {range1}, {range2}, {range3} and checks within which range the comparison value falls. On the basis of the range, the network infrastructure element determines (step 114) the group G1, G2, G3 and allocates (step 115) a radio resource unit for the transmissions from the user equipment from that particular group.

In the above example, Hadarmard codes have been used to illustrate the use of spreading codes and implementation of block-level spreading. However, for a person skilled in the art it is clear that also other types of the spreading codes may be applied. For example, Hadamard codes may be used only when the required length of the code is power of two. For other code lengths, for example code length of three, for example complex-valued GCL (Generalized Chirp Like) codes may be used.

Alternatively, a scheme using modulated Constant Amplitude Zero AutoCorrelation (CAZAC) sequences enables multiplexing different user equipment into a given time and frequency resource. This is achieved by allocating different cyclic shifts of CAZAC sequence for different user equipment. In sequence modulator a CAZAC sequence is modulated using binary phase shift keying (BPSK), quadrature phase shift keying (QPSK), or 8 phase shift keying (8PSK). Each sequence carries 1 bit, 2 bits, or 3 bits, depending on the applied modulation scheme. Here allocation of a physical resource block provides at maximum 12 orthogonal resources in 180 kHz frequency band each having a symbol rate of 12 ks/s. This assumes that 12 cyclic shifts of CAZAC codes are used by different user equipment. The requirement for orthogonality between user equipment is that the delay spread of the radio channel does not exceed the length of the cyclic shifts.

It is cleat that other code types and related orthogonality requirements may be applied without deviating from the scope of protection.

An embodiment of the invention may be implemented as a computer program comprising instructions for executing a computer process for radio resource allocation of a cellular telecommunication system. The computer program may be executed in the processing unit 218 of the network infrastructure element 216. The network infrastructure element 216 represents herein a logical element the processes of which can be performed in the processing unit of one network entity, or as a combination of processes performed in the processing units of a base station, radio network controller, or even some other elements (for example, servers, router units, switches, etc) of the telecommunication unit.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, an erasable programmable read-only memory, a computer readable software distribution package, a computer readable signal, a computer readable telecommunications signal, and a computer readable compressed software package.

Even though the invention has been described above with reference to examples in conjunction with the accompanying drawings, it is clear that the invention is not restricted thereto but it can be modified in several ways within the scope of the appended claims.

That which is claimed:

1. A method, comprising:
utilizing, in a cell, a radio resource formed from a plurality of radio resource units, wherein a radio resource unit corresponds to a separable unit in at least one of time or frequency domains and consists of one or more subcarriers within a timeslot, and wherein the radio resource unit includes one or more of a carrier frequency, a timeslot or a spread spectrum code;
dividing the radio resource units of a plurality of cells into more than one radio resource groups;
detecting in the cell a requirement of radio resource allocation for a user equipment;
determining, with a processor, an effective interference to be generated by the required radio resource to a defined group of neighbouring cells based on one or more measurement indications provided by the user equipment, the one or more measurement indications indicating a path loss to the defined group of neighboring cells; and
causing the radio resource from one of the radio resource groups to be allocated for a downlink to the user equipment within the cell based on the determined effective interference to be generated to the defined group of neighbouring cells, wherein causing the radio resource from one of the radio resource groups to be allocated comprises causing two or more user equipment to be allocated to the same radio resource group including the subcarriers of the one or more radio resource units that comprise the respective radio resource group based on similarity of the determined effective interference to be generated to the defined group of neighbouring cells by the two or more user equipment.

2. The method as claimed in claim 1, wherein determining the effective interference to be generated by the required radio resource to the defined group of neighbouring cells based on the one or more measurement indications provided by the user equipment comprises:
   receiving, in the user equipment, information indicating properties of one or more transmission paths to one or more neighbouring cells of the defined group;
   generating, in the user equipment, the one or more corresponding measurement indications based on the received information;
   sending, from the user equipment, the corresponding one or more measurement indications to a network infrastructure element responsible for allocating the radio resource;
   computing, in the network infrastructure element responsible for allocating the radio resource, the effective interference on the basis of the one or more measurement indications received from the user equipment;
   wherein:
      said computing the effective interference comprises computing the effective interference as total path loss to the defined group of cells.

3. The method as claimed in claim 1,
   wherein the radio resource units are further divisioned by a channelization code, the channelization code comprising a predefined spreading code;
   wherein the channelization code of the radio resource units in a radio resource group comprise a same predefined spreading code, and the radio resource units in different radio resource groups comprise different predefined spreading codes; and
   wherein the method further comprises determining said effective interference on the basis of the predefined spreading codes.

4. The method as claimed in claim 1, comprising:
   generating, in the user equipment, the measurement indication indicating a property of a transmission path between the user equipment and a transceiver in the cell;
   causing the measurement indication to be sent from the user equipment to a network infrastructure element responsible for allocating the radio resource units of the cell; and
   causing a radio resource unit from one of the radio resource groups to be allocated to the user equipment based on the measurement indication.

5. The method as claimed in claim 1 comprising:
   arranging the radio resource groups to correspond with defined ranges of measurement indication values;
   allocating to the two or more user equipment a radio resource unit from the same radio resource group that corresponds to a range within which measurement indications received from each of the two or more user equipment falls.

6. An apparatus comprising a processor and a memory storing program code instructions therein, the memory and program code instructions being configured to, with the processor, cause the apparatus to at least:
   receive information indicating properties of one or more transmission paths to one or more neighbouring cells;
   generate, based on the received information, corresponding one or more measurement indications;
   cause the one or more measurement indications to be sent to a network infrastructure element responsible for allocating a radio resource, the one or more measurement indications indicating a path loss to a defined group of neighboring cells; and
   utilize, in a cell, an allocated radio resource formed from a plurality of radio resource units for a downlink to user equipment within the cell, the allocation being based on an effective interference computed by the network infrastructure element based on the one or more measurement indications,
   wherein the radio resource unit corresponds to a separable unit in at least one of time or frequency domains and consists of one or more subcarriers within a timeslot, and wherein the radio resource unit includes one or more of a carrier frequency, a timeslot or a spread spectrum code,
   wherein the allocated radio resource including the subcarriers of the plurality of radio resource units that is utilized for the downlink is configured to be allocated to two or more user equipment based on similarity of the effective interference attributable to the measurement indications from the two or more user equipment.

7. The apparatus of claim 6, wherein the effective interference is computed by the network infrastructure element as a total path loss to the defined group of neighboring cells.

8. An apparatus comprising a processor and a memory storing program code instructions therein, the memory and program code instructions being configured to, with the processor, cause the apparatus to at least:
   control a defined radio resource of a cell, wherein the radio resource is formed from a plurality of radio resource units, wherein the radio resource unit corresponds to a separable unit in at least one of time or frequency domains and consists of one or more subcarriers within a timeslot, and wherein the radio resource unit includes one or more of a carrier frequency, a timeslot or a spread spectrum code;
   divide the radio resource units of the cell into more than one radio resource groups;
   detect a requirement of a radio resource allocation for a user equipment in the cell;
   determine an effective interference to be generated by the required radio resource to a defined group of neighbouring cells based on one or more measurement indications provided by the user equipment, the one or more measurement indications indicating a path loss to the defined group of neighboring cells; and
   cause the radio resource from one of the radio resource groups to be allocated for a downlink to the user equipment within the cell based on the determined effective interference to be generated to the defined group of neighbouring cells, wherein causing the radio resource from one of the radio resource groups to be allocated comprises causing two or more user equipment to be allocated to the same radio resource group including the one or more subcarriers of the one or more radio resource units that comprise a respective radio resource group based on similarity of the determined effective interference to be generated to the defined group of neighbouring cells by the two or more user equipment.

9. The apparatus of claim 8, wherein the memory and program code instructions are further configured to, with the processor, cause the apparatus to:

receive from the user equipment one or more measurement indications corresponding to properties of one or more transmission paths to the one or more defined neighbouring cells; and compute the effective interference on the basis of the one or more measurement indications received from the user equipment.

10. The apparatus of claim 9, wherein the memory and program code instructions are further configured to, with the processor, cause the apparatus to compute the effective interference as total path loss to the defined group of cells.

11. The apparatus of claim 10, wherein the one or more measurement indications provide channel quality indications (CQI); and the memory and program code instructions are further configured to, with the processor, cause the apparatus to compute the effective interference from the received channel quality indications.

12. The apparatus of claim 8, wherein the radio resource units are further divisioned by a channelization code, the channelization code comprising a predefined spreading code;

wherein the channelization code of the radio resource units in a radio resource group comprise a same predefined spreading code, and the radio resource units in different radio resource groups comprise different predefined spreading codes; and wherein the memory and program code instructions are further configured to, with the processor, cause the apparatus to determine said effective interference on the basis of the predefined spreading codes.

13. The apparatus of claim 8, wherein the memory and program code instructions are further configured to, with the processor, cause the apparatus to:

receive from the user equipment a measurement indication indicating a property of a transmission path between the user equipment and a transceiver of the cell;

allocate to the user equipment a radio resource unit from one of the radio resource groups of the one or more radio resource units on the basis of the measurement indication.

14. The apparatus of claim 8, wherein the memory and program code instructions are further configured to, with the processor, cause the apparatus to:

allocate to the two or more user equipment a radio resource unit from the same radio resource group that corresponds to a range within which the measurement indications received from each of the two or more user equipment falls;

wherein the radio resource groups correspond with defined ranges of measurement indication values.

15. The apparatus of claim 8, wherein the apparatus is implemented as an integrated circuit.

* * * * *